UNITED STATES PATENT OFFICE.

EMIL BARELL AND FRANZ ELGER, OF BASEL, SWITZERLAND, ASSIGNORS TO THE FIRM OF THE HOFFMANN-LA-ROCHE CHEMICAL WORKS, OF NEW YORK, N. Y.

HEXAMETHYLENE-TETRAMIN-DIGUAIACOL.

979,917.     Specification of Letters Patent.     Patented Dec. 27, 1910.

No Drawing.     Application filed June 18, 1910. Serial No. 567,692.

*To all whom it may concern:*

Be it known that we, EMIL BARELL, a citizen of the Swiss Confederation, and FRANZ ELGER, a subject of the Austro-Hungarian Emperor, residing at Basel, Switzerland, have invented a certain new and useful Compound of Guaiacol and Process for Obtaining the Same, of which the following is a specification.

According to our application for patent Serial No. 461,234 hexa-methylene-tetramin-triguaiacol is obtained, by causing guaiacol to act on hexa-methylene-tetramin in aqueous solution or by causing a formaldehyde-solution to act on ammoniacal guaiacol-solution in the proportions corresponding to the compound:

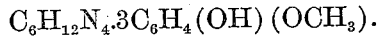
$$C_6H_{12}N_4.3C_6H_4(OH)(OCH_3).$$

Further experiments have shown, that besides the hexa-methylene-tetramin-triguaiacol, there exist other stable molecular compounds of hexa-methylene-tetramin and guaiacol. For instance, if 4 kilos of crystallized guaiacol are added to a warm solution of 8 kilos of hexa-methylene-tetramin in 10 liters of water, and the mixture is heated on a boiling water bath until a clear solution has been formed, the subsequent cooling causes the formation of crystals of a body, which is a hexa-methylene-tetramin-diguaiacol

$$C_6H_{12}N_4.2C_6H_4(OH)(OCH_3)$$

and corresponds to the hexa-methylene-tetramin-triguaiacol as regards its properties. On heating, the said compound softens at first, then it melts at about 90–95°, with 22 parts of water it yields a clear solution, it is easily soluble in cold alcohol and in chloroform, and on being distilled in a current of steam it yields guaiacol equal in weight to 63.9 per cent. of the new compound.

For producing the new compound, the guaiacol and the hexa-methylene may also be caused to act upon each other in a dry condition. For instance, if 124 grams of guaiacol are ground together with 70 grams of hexa-methylene-tetramin in a mortar the mixture assumes at first the consistency of a broth, and then that of a thick liquid. If the grinding and stirring is continued or if the mixture is left to itself for some time, the whole solidifies again and the hexa-methylene-tetramin-diguaiacol is obtained as a dry powder.

By varying the proportions, solid compounds are obtained whose analyses indicate, that we are dealing with mixtures of hexa-methylene-tetramin-mono-guaiacol and hexa-methylene-tetramin-diguaiacol, or with mixtures of hexa-methylene-tetramin-diguaiacol and hexa-methylene-tetramin-triguaiacol.

All these compounds may be easily split up into their components and are valuable for therapeutic purposes.

What we claim is:

1. The process for the production of hexa-methylene-tetramin-diguaiacol, which consists in causing guaiacol to act on hexa-methylene-tetramin in proportions corresponding to the compound

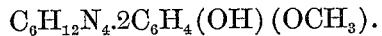
$$C_6H_{12}N_4.2C_6H_4(OH)(OCH_3).$$

2. As a new product, hexa-methylene-tetramin-diguaiacol, being a compound capable of crystallizing in the shape of brilliant needles, melting at about 90–95° C., forming with 22 parts of water a clear solution, easily soluble in cold alcohol and in chloroform and yielding guaiacol 63.9 per cent. of its weight, when distilled in a current of steam, substantially as described.

In testimony whereof we have hereunto set our hands in presence of subscribing witnesses.

EMIL BARELL.
             FRANZ ELGER.

Witnesses:
    D. FISCHER,
    GEO. GIFFORD,
    A. TROENDLE,
    ARNOLD ZUBER.